United States Patent
Buchmayer et al.

(10) Patent No.: US 10,080,141 B2
(45) Date of Patent: Sep. 18, 2018

(54) METHOD AND DEVICE FOR ASSIGNING SPECTRAL RESOURCES IN A CELLULAR NETWORK

(71) Applicant: Telefonaktiebolaget L M Ericsson (publ), Stockholm (SE)

(72) Inventors: Mats Buchmayer, Stockholm (SE); Claes Andersson, Stockholm (SE); Håkan Persson, Solna (SE); William Warrillow, Athlone (IE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 144 days.

(21) Appl. No.: 14/758,257

(22) PCT Filed: Jun. 16, 2015

(86) PCT No.: PCT/EP2015/063450
§ 371 (c)(1),
(2) Date: Jun. 29, 2015

(87) PCT Pub. No.: WO2015/193294
PCT Pub. Date: Dec. 23, 2015

(65) Prior Publication Data
US 2016/0255508 A1    Sep. 1, 2016

Related U.S. Application Data

(60) Provisional application No. 62/012,492, filed on Jun. 16, 2014.

(51) Int. Cl.
*H04W 16/14*    (2009.01)
*H04W 4/02*    (2018.01)
(Continued)

(52) U.S. Cl.
CPC ........ *H04W 16/14* (2013.01); *H04W 4/021* (2013.01); *H04W 28/26* (2013.01);
(Continued)

(58) Field of Classification Search
CPC   H04W 4/02–4/046; H04W 8/00–8/30; H04W 16/00–16/32; H04W 24/02;
(Continued)

(56) References Cited

U.S. PATENT DOCUMENTS

2013/0090071 A1*  4/2013  Abraham .............. H04W 16/14
455/73
2013/0295948 A1   11/2013  Ye et al.
(Continued)

FOREIGN PATENT DOCUMENTS

WO    2012156587 A1   11/2012
WO    2014/027403 A1   2/2014

OTHER PUBLICATIONS

Khun-Jush, J., et al., "Licensed shared access as complementary approach to meet spectrum demands: Benefits for next generation cellular systems", ETSI Workshop on Reconfigurable Radio Systems, Dec. 12, 2012, pp. 1-8, Cannes, France.*
(Continued)

*Primary Examiner* — Timothy J Weidner
(74) *Attorney, Agent, or Firm* — Coats & Bennett, PLLC

(57) ABSTRACT

A technique for assigning spectral resources in a cellular network for wireless communications is described. The spectral resources are partly utilized by other applications. As to a method aspect of the technique, a controller (100) of the cellular network receives information (702) indicative of one or more geographical areas and restrictions within the one or more geographical areas (1002). The spectral resources are assigned based on the received information (702).

28 Claims, 8 Drawing Sheets

(51) Int. Cl.
*H04W 28/26* (2009.01)
*H04W 72/04* (2009.01)
*H04W 72/12* (2009.01)
*H04W 88/12* (2009.01)
*H04W 92/12* (2009.01)
*H04W 92/22* (2009.01)
*H04W 4/021* (2018.01)

(52) U.S. Cl.
CPC ... *H04W 72/0433* (2013.01); *H04W 72/0453* (2013.01); *H04W 72/1215* (2013.01); *H04W 88/12* (2013.01); *H04W 92/12* (2013.01); *H04W 92/22* (2013.01)

(58) Field of Classification Search
CPC .... H04W 28/16–28/26; H04W 64/00–64/006; H04W 28/08–28/085; H04W 52/30–52/346; H04W 68/12; H04W 72/04–72/1263; H04W 76/02–76/021; H04W 80/08; H04W 88/10–88/12; H04W 88/18; H04W 92/02; H04W 92/06; H04W 92/12; H04W 92/22
See application file for complete search history.

(56) References Cited

U.S. PATENT DOCUMENTS

| | | | |
|---|---|---|---|
| 2015/0036509 A1* | 2/2015 | Lopes | H04W 16/10 |
| | | | 370/241.1 |
| 2015/0148090 A1 | 5/2015 | Shimomura | |
| 2016/0119793 A1* | 4/2016 | Tudose | H04W 16/14 |
| | | | 455/447 |

OTHER PUBLICATIONS

Marques, P. et al., "Spectrum Sharing in the EU and the Path Towards Standardization", 2013 Future Network & Mobile Summit, Conference Proceedings, Jul. 3, 2013, pp. 1-9.

M. Palola, et al., Live field trial of Licensed Shared Access (LSA) concept using LTE network in 2.3 GHz band, 2014 IEEE International Symposium on Dynamic Spectrum Access Networks (DYSPAN), pp. 38-47.

* cited by examiner

100

200

500

```
+--------------------------------------------------+
|AVAIL_SPECTRUM_REQ                                |
+----------------------------------+---------------+
|deviceDesc:DeviceDescriptor       | see description |
|location:GeoLocation              | see description |
|owner:DeviceOwner                 | optional      |
|antenna:AntennaCharacteristics    | optional      |
|capabilities:DeviceCapabilities   | optional      |
|masterDeviceDesc:DeviceDescriptor | optional      |
|masterDeviceLocation:GeoLocation  | optional      |
|requestType:string                | optional      |
|..................................|...............|
|*other:any                        | optional      |
+----------------------------------+---------------+
```
← 502

METHOD AND DEVICE FOR ASSIGNING SPECTRAL RESOURCES IN A CELLULAR NETWORK

TECHNICAL FIELD

The present disclosure generally relates to a technique for assigning spectral resources in a cellular network. More specifically, and without limitation, methods and devices are provided for assigning spectral resources that are, at least partly, shared with other applications.

BACKGROUND

Cellular technologies, such as GERAN (GSM EDGE radio access network), UTRAN (UMTS terrestrial radio access network), LTE (Long Term Evolution), Wi-Fi, etc., require spectrum resources as basic means of data and voice communication. Spectrum is fundamental to the success of wireless communications and mobile operators rely on exclusive licenses as a key asset for ensuring predictable service.

The range of spectrum that is made available for wireless communications has increased over years, but despite this increase the demand for new spectrum still exceeds the available exclusive spectrum. The scarcity of spectrum has created a need for techniques for assigning spectrum resources, which allows sharing licensed spectrum with other operations or applications.

One framework to address the sharing of spectrum is Licensed Sharing Access (LSA), also sometimes referred to as Authorized Shared Access (ASA) or Spectrum Access System (SAS). Within this framework, it would be feasible for an operator or other licensee to use spectrum that is partly utilized already by other applications.

A basic framework to handle the sharing of spectrum and to avoid interference between applications has been defined by the Internet Engineering Task Force (IETF) as a Protocol to Access White-Space Databases (PAWS). The framework of LSA extends beyond the capabilities defined in the IETF PAWS.

Standardization of an LSA framework and related interfaces is ongoing in the European Telecommunications Standards Institute (ETSI) as a Reconfigurable Radio Systems (RRS). In parallel, the Federal Communications Commission (FCC) in the USA is defining a regulatory framework for use of spectrum at 3.5 GHz as a step in the President's Council of Advisors on Science and Technology (PCAST) recommendations to identify 1000 MHz of federal spectral resources to create shared-use spectrum superhighways.

In the framework defined by the FCC, the use of SAS is required. The SAS is not only required to ensure that licensees use the correct set of spectrum resources, e.g. in terms of frequency, geographical and timing domain. The SAS is also required to monitor the utilization of the spectrum resources by licensees.

SUMMARY

Accordingly, there is a need for a technique that allows sharing spectral resources efficiently at least in certain scenarios.

As to one aspect, a method of assigning spectral resources in a cellular network for wireless communications is provided. The spectral resources are partly utilized by other applications. The method comprises or triggers the step of receiving, at a controller of the cellular network, information indicative of one or more geographical areas and restrictions within the one or more geographical areas; and the step of assigning spectral resources based on the received information.

By providing information indicative of available and/or restricted spectral resources as a function of the geographical area, the cellular network can flexibly and efficiently use more spectral resources. Inflexible and inefficient general restrictions, e.g., countrywide restrictions, can be avoided in at least some embodiments. The spectral resources can be used by different applications in different, e.g., neighboring, geographical areas. Usage of the spectral resources may be mutually exclusive with respect to the geographical areas.

An entity or service operator that operates one or more of the other applications may also be referred to as incumbent. The other applications may include radar, fixed-satellite system (FSS), radio and television broadcasting, etc. Alternatively or in addition, the other applications may include (more or less) ad hoc applications, e.g., Programme Making and Special Events (PMSE) or temporal events.

The incumbent may operate in one or more of the geographical areas. Only for those geographical areas actually or currently used by the incumbent, the restriction may be indicated. For other geographical areas, no restriction or an express availability may be indicated for at least some of the spectral resources used by the incumbent. The cellular network may assign, partly or completely, the spectral resources, if no restriction or the express availability is indicated.

The method may further comprise or trigger the step of performing a mapping between radio transmitters of the cellular network and the one or more geographical areas. Alternatively or in addition, the method may further comprise or trigger the step of transferring the information to a separate entity for a mapping between radio transmitters of the cellular network and the one or more areas.

Furthermore, the radio transmitters may include base stations of the cellular network. The one or more geographical areas may be mapped to locations and/or coverage areas of the base stations.

The step of assigning may include setting a configuration of the respective radio transmitters. The configuration may relate to at least one of output power levels, antenna directions, antenna tilts and frequencies.

The controller may be implemented at and/or by a network management system of the cellular network.

The restrictions in the information may restrict usage of the spectral resources for the wireless communications. Alternatively or in addition, the received information may positively indicate availability of the spectral resources.

The information may be received from a repository. The repository may be accessed by, or accessible to, a plurality of different controllers. The plurality of controllers may include the receiving controller. Alternatively or in addition, the repository may be accessed by, or accessible to, different cellular networks including the cellular network. Alternatively or in addition, the repository may be located, physically and/or topologically, outside of a domain of the cellular network.

The repository may keep a set of the restrictions. The set may be updated, e.g., regularly, periodically or event-triggered. The restrictions indicated in the information may be a subset of the set of restriction kept at the repository. The subset may be selected, e.g., by the repository, according to the indicated geographical area.

The restrictions relate to at least one of geographical aspects, frequency aspects, power level aspects and timing aspects. Alternatively or in addition, the restrictions may include at least one of regulatory restrictions and incumbent restrictions.

The received information may be included in a message. The message may be sent from the repository to the controller. The message and/or the information may be structured according to a Licensed Sharing Access, LSA, protocol.

The one or more geographical areas may be specified by means of polygons. The polygon may be specified by indicating the corners of the polygon, e.g., by means of latitude and longitude coordinates. The geographical area may be the convex hull of the specified corners.

As to another aspect, a method of assigning spectral resources in a cellular network for wireless communications is provided. The spectral resources are partly utilized by other applications. The method comprises or triggers the step of storing a set of restrictions for the spectral resources; and the step of sending, to a controller of the cellular network, information indicative of one or more geographical areas and restrictions within the one or more geographical areas.

The method may further comprise or trigger the step of updating the set of restrictions for the spectral resources.

The method may further comprise or trigger the step of receiving information indicative of regulatory or incumbent restrictions for updating the set of restrictions for the spectral resources.

The method may be implemented by a repository. The method may further comprise any feature or step corresponding to a feature or a step disclosed in the context of the other one aspect.

As to a further aspect, a computer program product is provided. The computer program product comprises program code portions for performing any one of the steps of the method aspects disclosed herein when the computer program product is executed by one or more computing devices. The computer program product may be stored on a computer-readable recording medium. The computer program product may also be provided for download via a data network, e.g., the cellular network and/or the Internet.

As to one hardware aspect, a device for assigning spectral resources in a cellular network for wireless communications is provided. The spectral resources are partly utilized by other applications. The device is configured to perform or trigger the step of receiving, at a controller of the cellular network, information indicative of one or more geographical areas and restrictions within the one or more geographical areas; and the step of assigning spectral resources based on the received information.

As to another hardware aspect, a device for assigning spectral resources in a cellular network for wireless communications is provided. The spectral resources are partly utilized by other applications. The device is configured to perform or trigger the step of storing a set of restrictions for the spectral resources; and the step of sending, to a controller of the cellular network, information indicative of one or more geographical areas and restrictions within the one or more geographical areas.

Any one or both of the devices may further include any feature disclosed in the context of the method aspects. Particularly, the device may comprise a unit adapted to perform one or more of the steps of the corresponding method aspect.

As to a further hardware aspect, a node of a cellular network is provided. The node comprises a device according to the one hardware aspect.

As to a still further hardware aspect, a repository is provided. The repository comprises a device according to the other hardware aspect.

BRIEF DESCRIPTION OF THE DRAWINGS

Further details of embodiments of the technique are described with reference to the enclosed drawings, wherein:

FIG. 5 schematically illustrates an example structure for a request message;

DETAILED DESCRIPTION

In the following description, for purposes of explanation and not limitation, specific details are set forth, such as a specific network environment in order to provide a thorough understanding of the technique disclosed herein. It will be apparent to one skilled in the art that the technique may be practiced in other embodiments that depart from these specific details. Moreover, while the following embodiments are primarily described for Long Term Evolution (LTE) and 5G implementations, it is readily apparent that the technique described herein may also be implemented in any other wireless communication network, including a Wireless Local Area Network (WLAN) according to the standard family IEEE 802.11 (e.g., IEEE 802.11a, g, n or ac; also referred to as Wi-Fi) and/or a Worldwide Interoperability for Microwave Access (WiMAX) according to the standard family IEEE 802.16.

Moreover, those skilled in the art will appreciate that the services, functions, steps and units explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a system comprising a computer processor and memory coupled to the processor, wherein the memory is encoded with one or more programs that may perform the services, functions, steps and implement the units disclosed herein.

Figure 1:
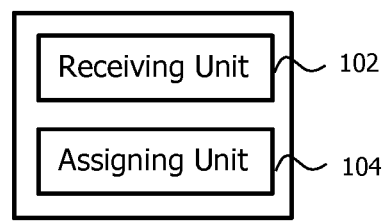
FIG. 1 shows a schematic block diagram of a device for assigning spectral resources for wireless communications, which is implementable for or in a cellular network.

FIG. 1 schematically illustrates a device 100 for assigning spectral resources in a cellular network for wireless communications. The device 100 comprises a receiving unit 102 for receiving information as to usage of the spectral resources that are shared with applications other than wireless communications in cellular networks. The device 100 further comprises an assigning unit 104 for assigning the spectral resources in the cellular network.

The device 100 may be implemented at a node of the cellular network, e.g., so that the device 100 provides the received information to, or is integrated in, an entity for cellular network planning.

Figure 2:
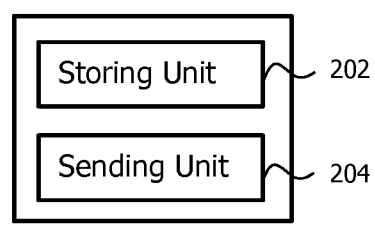
FIG. 2 shows a schematic block diagram of a device for assigning spectral resources for wireless communications, which is implementable for or in a repository.

FIG. 2 schematically illustrates a device 200 for assigning spectral resources in a cellular network for wireless communications. The device 200 comprises a storing unit 202 for storing a set of restrictions on usage of the spectral resources that are shared with applications other than wireless communications in cellular networks. The device 200 further comprises a sending unit 204 for sending information as to the usage to a controller of the cellular network.

The device 200 may be implemented in a node outside of the cellular network, e.g., so that the device 200 is accessible to multiple cellular networks.

Figure 3:
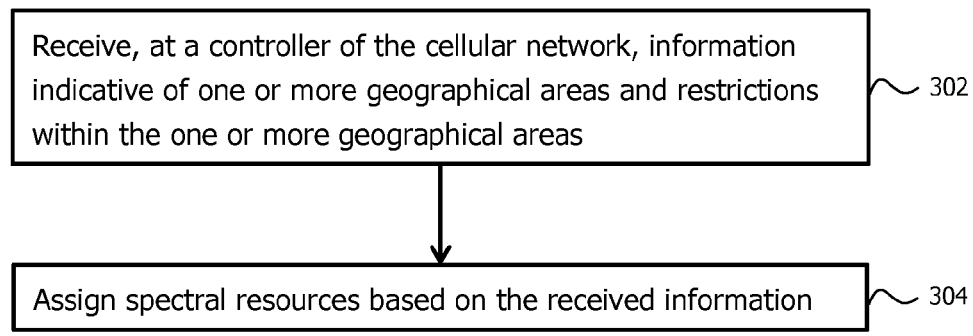
FIG. 3 shows a flowchart for a method of assigning spectral resources, which is implementable by the device of FIG. 1.

FIG. 3 shows a flowchart for a method 300 of assigning spectral resources in a cellular network for wireless communications. In a step 302, a controller of the cellular network receives information indicative of area-specific restrictions. The information is processed when assigning the spectral resources in a step 304.

The method 300 may be implemented by the device 100 and/or in the cellular network. E.g., the units 102 and 104 may perform the steps 302 and 304, respectively.

Figure 4:
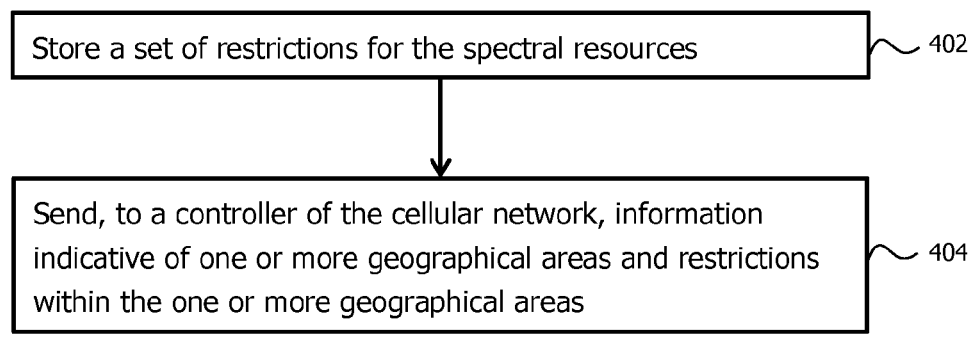
FIG. 4 shows a flowchart for a method of assigning spectral resources, which is implementable by the device of FIG. 2.

FIG. 4 shows a flowchart for a method 400 of assigning spectral resources in a cellular network for wireless communications. In a step 402, a set of area-specific restrictions for usage of the spectral resources is stored. Information indicative of at least a subset of the restrictions is sent to a controller of the cellular network in a step 404.

The method 400 may be implemented by the device 200 and/or in a repository. E.g., the units 202 and 204 may perform the steps 402 and 404, respectively.

An existing Protocol to Access White-Space (PAWS) defined by the Internet Engineering Task Force (IETF) enables a so-called TV White Space (TVWS) device, e.g., the device 100, to access available spectrum via an Available Spectrum Query procedure. The procedure is initiated by a message 500 from the TVWS device, AVAIL_SPECTRUM_REQ.

An example structure of the message 500 is schematically illustrated in FIG. 5. The message 500 includes a geo-location 502 of the TVWS device and parameters such as device identifier, capabilities, and characteristics (as defined by rules set). The message is sent to a spectrum database that maintains an updated view of available spectrum resources.

Figure 6:
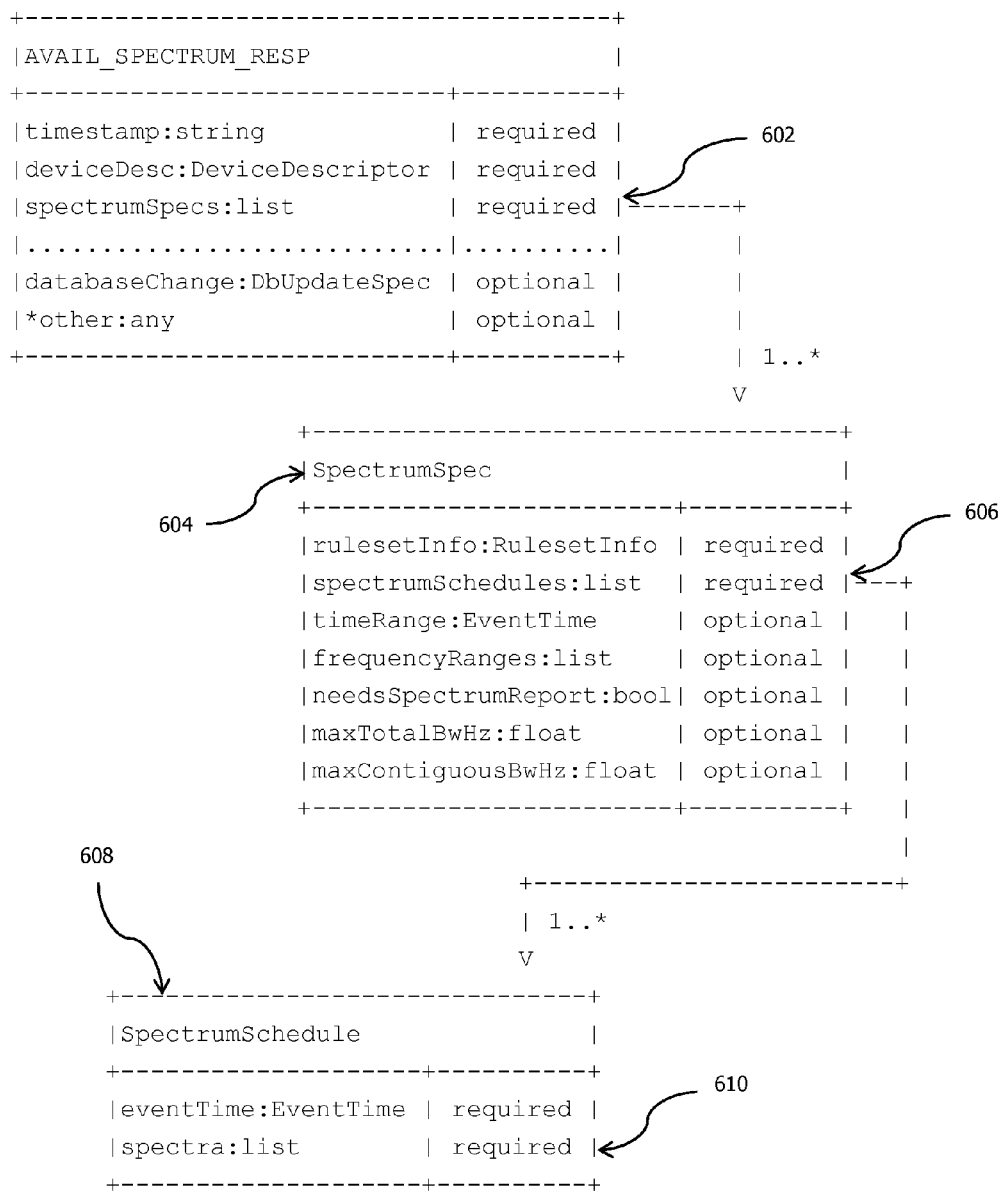
FIG. 6 schematically illustrates an example structure for a response message.

If the correct information is provided, the database may respond with a message 600. An example structure of the message 600, AVAIL_SPECTRUM_RESP, is schematically illustrated in FIG. 6. The message 600 includes one or more SpectrumSpec elements, one for each ruleset supported at the location specified in the corresponding AVAIL_SPECTRUM_REQ request 500.

A spectrum specification 604 is referenced in the message 600 at reference sign 602. The spectrum specification 604 includes a reference 606 to a spectrum schedule 608. Spectra are listed at reference sign 610 in the spectrum schedule 608.

The existing IETF PAWS specification also supports a request for a list of radio transmitters, in AVAIL_SPECTRUM_BATCH_REQ.

If there is a protection zone (also referred to as geographical area), in which a user and/or operator is given a set of restrictions as to how transmitted radio signals on some of the frequencies that the operator is allowed to be used, the operator is required to plan the deployment such that the protection zone is not infringed. This is typically done by using a cell planning tool, wherein sites, output power levels, antenna directions, frequencies, tilt etc. are decided, in order to provide the required coverage. Exclusion zones and/or protection areas can be included in the decision process to secure that the coverage does not expand into those protected areas. This will put limitations on the site locations, output power levels, antenna directions, tilt, etc.

IETF PAWS protocol is defined under the assumption that the transmitting device has a direct connection established to the database that either rejects access to spectrum or provides an appropriate list of information for the one or more devices with accepted access.

The direct connection (from the transmitting device to the database) is not suitable for an operator network in which several (sometimes thousands of) base stations provide continuous coverage. Even if the number of connections can be handled in the database, an operator puts substantial effort into planning coverage, either through a manual process or a more automated process that is supported by the network, e.g., Self-Organizing Network (SON) functionality, such as Mobility Load Balancing, Mobility Robustness Optimization, etc.

While the IETF PAWS supports a grouped request for spectrum, e.g., using an AVAIL_SPECTRUM_BATCH_REQ message, the database will interpret each position in the batch request as if it were an independent request and return results consistent with multiple individual AVAIL_SPECTRUM_REQ requests. These results are returned in a batched response message.

Setting the radio configuration parameters of the one or more bases stations, to ensure a certain geographical coverage, is based on prediction models created by cell planning tools. This network planning process is aimed at enhancing network performance and efficiency of spectrum utilization, thereby, supporting the operator differentiation on network quality. If this functionality is intervened by an external entity, which is external relative to the operator, e.g., the existing PAWS database, and which is allowed to set output power levels, frequency, tilt, etc., then the operator differentiation and spectrum utilization may suffer.

The embodiments implement methods 300 and 400, as well as related signaling, to support an operator centric control of radio transmitting resources within and LSA/ASA/SAS framework, but still conforming to the Regulatory and Incumbent requirements.

The methods to achieve this include providing one geographical area or a set of geographical areas, such as described by, e.g., polygons, to a controller, e.g., the device 100. The controller 100 may be a part of a network management system (NMS) or operations support system (OSS) of the mobile operator. The geographical area description, such as the polygon description, includes a set of characteristics that describe the restrictions within the given geographical area.

According to embodiments, means to transfer the knowledge of the areas that need protection are provided. The information is transferred from a repository, e.g., the device 200, to a separate entity, e.g., the device 100, which performs a mapping between protection zone and radio transmitters (e.g., one or more base stations).

E.g., the geographical areas are mapped to location and/or coverage of the radio transmitters. The details specific to the one or more radio transmitters are not available in the repository 200. In contrast, the one or more areas that need protection are not available at or in the radio transmitters (e.g., as defined in IETF today).

Figure 7:
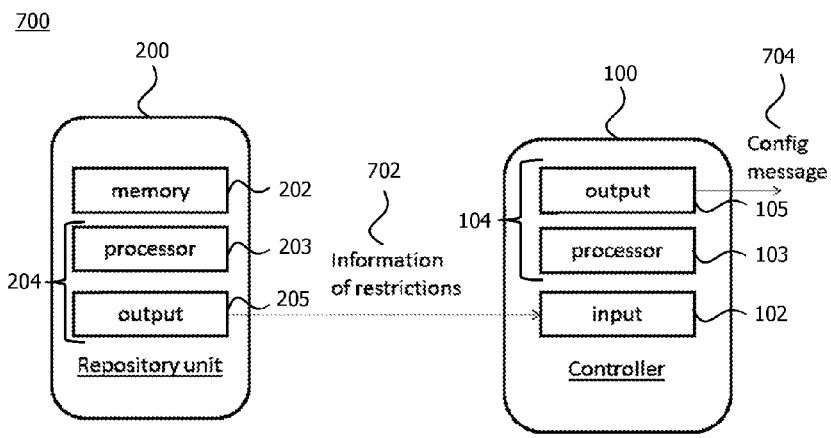
FIG. 7 shows a schematic block diagram for a system comprising embodiments of the devices of FIGS. 1 and 2.

FIG. 7 schematically illustrates a system embodiment, individual devices and units of which may be implemented separately.

Accordingly, a repository 200 is provided. The repository 200 may be a logical and/or physical unit. The repository 200 is configured to keep an updated set of Incumbent and/or Regulatory restrictions including, e.g., geographical, frequency, power levels, and timing aspects. Hence, the repository 200 is configured to provide area information 702, exemplified as one or a set of polygons, to a controller 100, as described above. Information 702 of the restrictions is sent in a message to the controller 100.

Further, a controller 100 is provided. The controller 100 may be a logical and/or physical unit. The controller 100 may be part of the mobile operator domain. The controller 100 is configured to receive the above-described restrictions 1004, from the Repository unit. By receiving the restriction, the controller 100 can set the appropriate configuration of the respective radio transmitters without infringing on the incumbents protection zone.

The repository 200 comprises means 202 adapted to store an updated set of Incumbent and Regulatory restrictions (e.g., a memory), means 203 to create a message 702 comprising said restrictions (e.g., at least one processor), and means 205 to send the message 702 (e.g., an output unit).

The controller 100 comprises means 102 adapted to receive the message 702 sent by the repository 200 (e.g., an input unit), means 103 to process the message 702, and to create configuration parameters for the radio transmitters (e.g., a processor), and means 105 to send a message 704 comprising the configuration parameters (e.g., an output unit).

In an embodiment, the controller 100 may comprise an input unit 102 adapted to receive a message 702, a processing unit 103 adapted to process the message 702, a memory to store information, and an output unit 105 adapted to send a message 704. The output unit 105 may be a wireless transceiver or terminal of a wireless or fixed communication system.

In an embodiment, the repository 200 may comprise an output unit 205 adapted to send a message 702, a processing unit 203 adapted to process the message 702, and a memory 202 to store information. The output unit 205 may be a wireless transceiver or terminal of a wireless or fixed communication system.

The base stations comprising the radio transmitters are configured to receive the configuration message 704. The base station is further configured to update its configuration accordingly.

The embodiments allow for an operator centric control of radio transmitting resources within an LSA/ASA/SAS framework conforming to the Regulatory and Incumbent requirements, limiting the need of information exchange of the details of the radio network, reducing the amount of signaling. Hence, the embodiments allow for an efficient utilization of radio resources.

Figure 8:
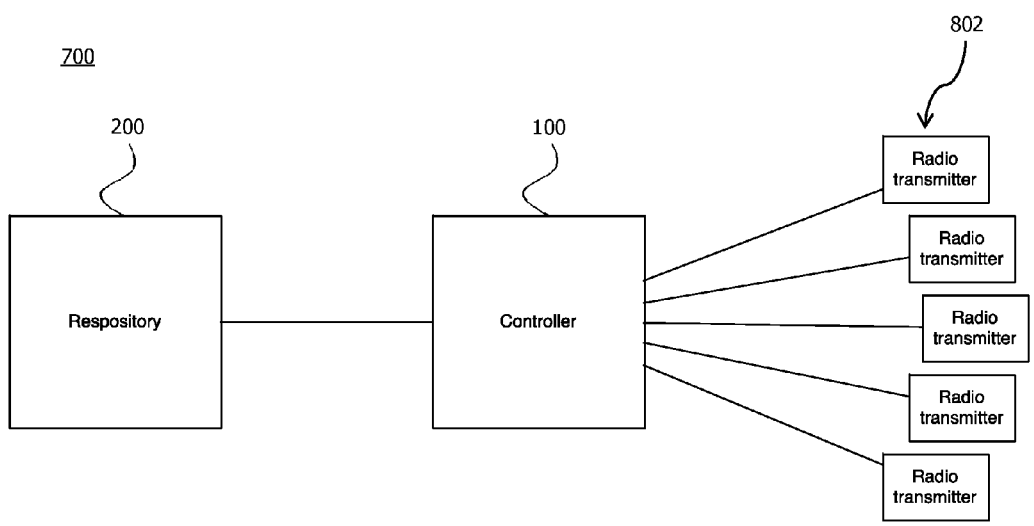
FIG. 8 schematically illustrates an example connectivity for the system of FIG. 7 further comprising radio transmitters.

An example logical architecture for the framework, e.g., a system implementing an LSA/ASA architecture, is depicted in FIG. 8. The radio transmitters are shown at reference sign 802.

Embodiments implementing the methods 300 and 400 cause a related signaling to support an operator centric control of radio transmitting resources within an LSA/ASA/SAS framework, which conforms to the Regulatory and Incumbent requirements.

The message comprising the information 702 received at the controller 100 may be an LSA Spectrum Resource Availability Information (LSRAI), e.g., according to document ETSI TS 103 235 V0.0.11, Sect. 3.1 and/or Sect. 5.4.2.

The information 702 may convey an LSA spectrum resource. The controller 100 may be operated by an LSA licensee. The controller 100 may use, or may trigger using, the LSA spectrum resource indicated by the information 702. Alternatively or in addition, the information 702 may convey operational conditions or restrictions that the controller 100 or LSA licensee shall apply. The operational conditions or restrictions may relate to the respective LSA spectrum resource.

The information 702 may be indicative of one or more spectrum resources. The spectrum resource may be shared between the incumbent and the LSA licensee, e.g., on a static or dynamic basis and/or according to a Sharing Framework.

The Sharing Framework may include a set of sharing rules or sharing conditions, which may define a change, if any, in the spectrum rights of the incumbent and/or may define the spectrum, with corresponding technical and operational conditions, that can be made available for alternative usage under LSA. The Sharing Framework may be defined by an administration or National Regulatory Authority (NRA).

Alternatively or in addition, the LSRAI 702 may be conveyed to the controller 100 in messages originated in the repository 200. For example, the LSRAI 702 may include an availability notification.

Under normal operating conditions, the repository 200 may be aware of the LSRAI 702 that is known to the controller 100. The repository 200 may store relevant associated information, e.g., a status of acknowledgements received from the controller 100. The controller 100 may refrain from initiating an LSA operation unless the controller 100 has received the relevant LSRAI 702. The controller 100 may take steps to ensure, e.g., on an ongoing basis, that the controller 100 holds valid and/or relevant LSRAI 702.

The LSRAI 702 may be associated with a validity time, e.g., when received by the controller 100. When the validity time expires, the controller 100 may consider that the associated LSRAI 702 is no longer applicable and/or may initiate actions to obtain an updated LSRAI 702.

The LSRAI 702, e.g., the indicated geographical area and/or the indicated restrictions, may include support for the definition of exclusion, restriction and/or protection zones. Requirements for the zones may be defined, e.g., according to ETSI TS 103 154, V1.1.1, Sect. 6.

Examples of exclusion and protection zone parameters may include those of ECC Recommendation (15)04 ("Guidance for the implementation of a sharing framework between MFCN and PMSE within 2300-2400 MHz").

A format for the LSRAI 702 may include further definitions and/or may support future extensions in order to enable an evolution of sharing rules or the needs of particular deployments.

Figure 9:
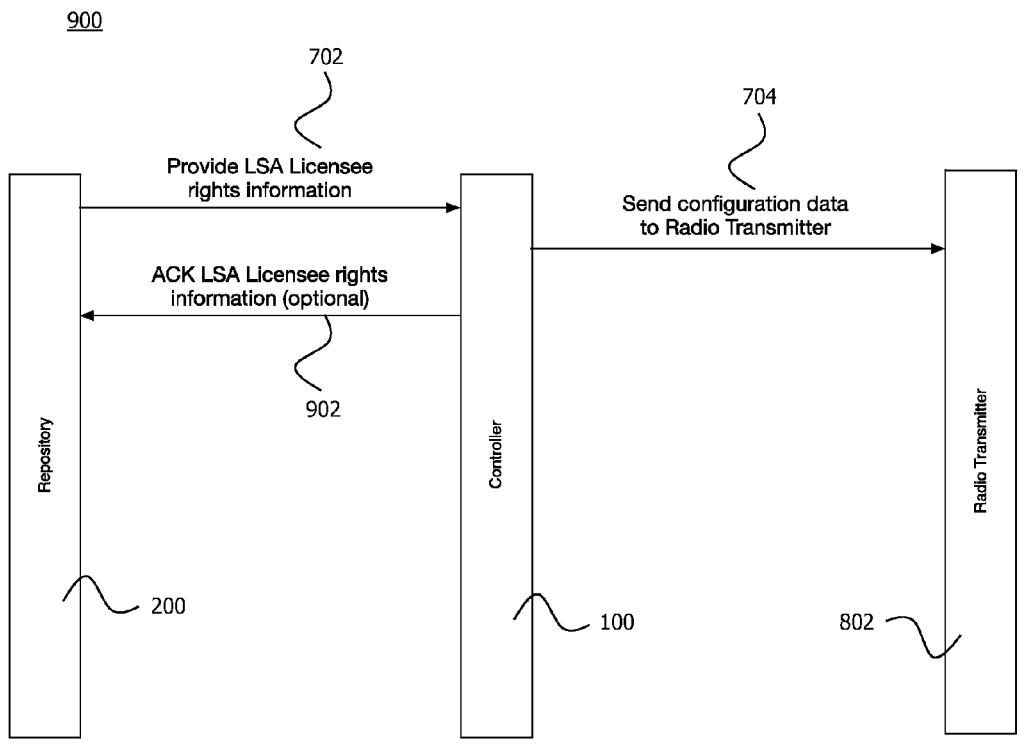
FIG. 9 schematically illustrates an example signaling between the devices of FIGS. 1 and 2 when performing the methods of FIGS. 3 and 4.

An example sequence flow 900 is shown in FIG. 9. The sequence flow 900 includes an embodiment of the signaling.

The sequence flow 900 of FIG. 9 may be triggered by a connection establishment procedure, or similar, by the controller 100 towards the repository 200.

One embodiment, depicted in FIG. 9, includes an entity, e.g., the device 200, called the repository. The repository 200 provides one polygon or a set of polygons to a separate entity, e.g., the device 100, called the controller.

The message 702 is exemplified by LSA Licensee rights information. An optional acknowledgement message from the controller 100 to the repository 200 is shown at reference sign 902.

Figure 10:
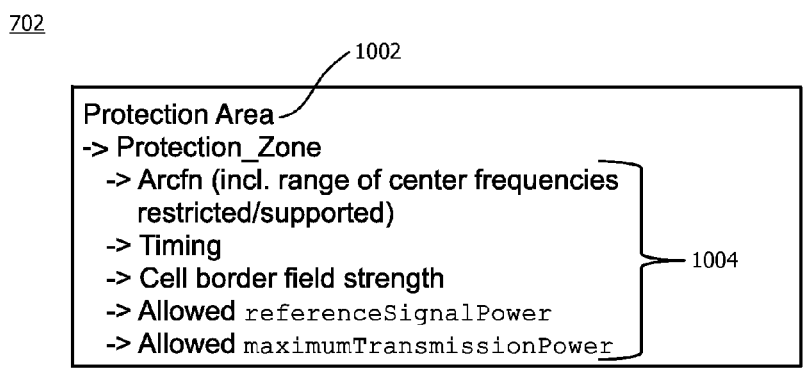
FIG. 10 schematically illustrates an embodiment of information exchanged between the devices of FIGS. 1 and 2.

The structure of such a message or corresponding information 702 is exemplified by FIG. 10. The information 702 is indicative of geographical areas 1002 and restrictions 1004 in the geographical areas 1002.

The repository 200 is a logical and/or physical unit that is configured to keep an updated set of Incumbent and Regulatory restrictions including, e.g., geographical, frequency, power levels, and timing aspects. Hence, the repository 200 is configured to provide the area information 1002, exemplified as one or a set of polygons, to the controller 100, as described above.

The repository 200 may be under the control of the Incumbent or the Regulator, or a third party that has been given the right to manage the repository 200. The input data, e.g., the set of restrictions, optionally stored in the memory 202, will be provided by Incumbent and Regulator. The updated set of Incumbent and Regulatory restrictions may be the sum of restrictions set by Incumbent and Regulator, which would comprise the LSA Licensee rights information 704.

The controller 100 is a logical and/or physical unit, which may be part of the mobile operator domain. Upon reception of restrictions, e.g., the above-described restrictions 1004, from the repository 200, the controller 100 is configured to not infringe on the incumbents protection zone 1002, and to set the appropriate configuration 704 of the respective radio transmitters 802. The radio transmitters 802 may be the radio transmitters of base stations (e.g., eNBs).

The controller 100 can be located in any appropriate node or nodes. According to an embodiment, the controller 100 is located in part of a mobile operator management system (e.g., an operations support system, OSS).

As an example, the message depicted as the LSA Licensee rights information may include a structure in line with FIG. 10. FIG. 10 shows attributes for an embodiment of the LSA Licensee right information message 702.

The protection zone message may include area information 702 exemplified by a set of points, each of the points being defined by a longitude and a latitude. The set of points may define a polygonal protection zone 1002.

Each area information 702, such as each defined polygon, may include, or be associated with, a set of attributes that define the restrictions 1004 within the protection zone 1002, such as Absolute Radio-Frequency Channel Number (AR-FCN), timing, allowed reference signal power and allowed maximum transmission power.

The ARFCN, and the specific range of frequencies, includes restricted frequencies (e.g., sub-carrier).

The Timing may include a start and stop time for which the restriction is valid.

Cell border field strength may include the maximum field strength level allowed within the protection zone 1002.

Allowed referenceSignalPower may include a maximum reference signal allowed in the protection zone 1002, e.g., allowing pico or femto cell deployment within a protection zone 1002.

Allowed maximumTransmissionPower may include a maximum output transmission power from a base station located in the protection zone when allowed in the protection zone, e.g. allowing pico or femto cell deployment within a protection zone 1002.

Figure 11:
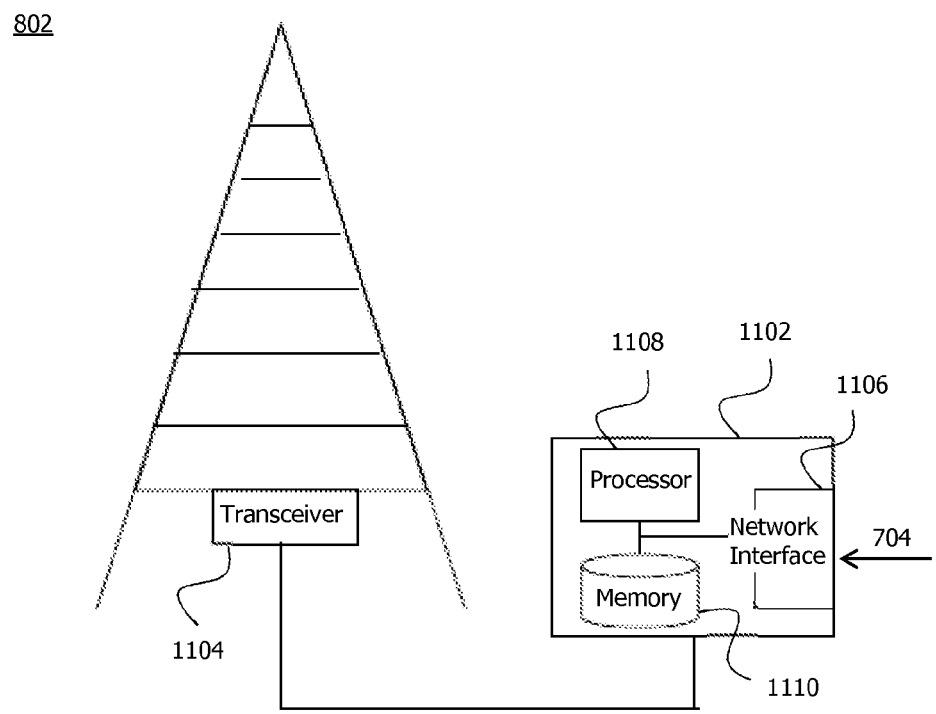
FIG. 11 schematically illustrates an embodiment of a radio transmitter connectable to the device of FIG. 1.

FIG. 11 shows a schematic block diagram for an example base station as the radio transmitter 802. Although the illustrated base station 802 may represent network nodes that include any suitable combination of hardware and/or software, the base station 802 may, in particular embodiments, represent a device such as the example base station illustrated in FIG. 12.

The base station 802 may include a node 1102 and a transceiver 1104 coupled to the node 1102. The node 1102 may comprise a network interface 1106 for receiving the configuration information 704, e.g., via a backhaul network of the cellular network. The configuration information 704 may be processed by a processor 1108. Configuration values derived by the processor 1108 may be stored in memory 1110.

Alternatively or in addition, as shown in FIG. 11, the example base station 802 includes a processor 1108, a memory 1110, a transceiver 1104, and an antenna. In particular embodiments, some or all of the functionality described above as being provided by a mobile base station, a base station controller, a node B, an enhanced node B, and/or any other type of mobile communications node, may be provided by the base station processor 1108 executing instructions stored on a computer-readable medium, such as the memory 1110 shown in FIG. 11. Alternative embodiments of the base station 802 may include additional components responsible for providing additional functionality, including any of the functionality identified above and/or any functionality necessary to support the solution described above.

Figure 12:
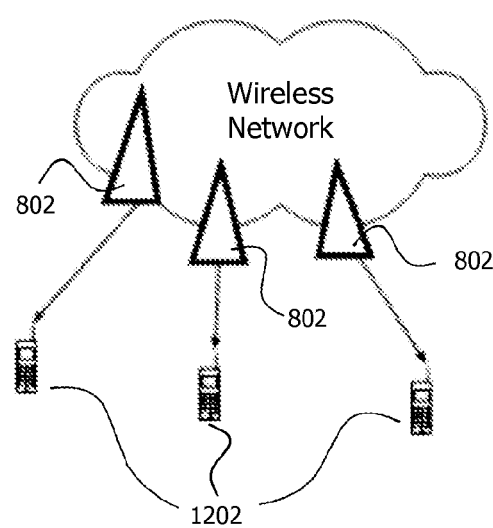
FIG. 12 schematically illustrates a cellular network for wireless communications.

Although the described technique may be implemented in any appropriate type of telecommunication system, e.g., supporting any suitable communication standards and using any suitable components, particular embodiments of the described technique may be implemented in a network, e.g., the network 1200 illustrated in FIG. 12.

As shown in FIG. 12, the example network 1200 may include one or more instances of user equipment (UEs) 1202 and one or more base stations 802 capable of communicating with these UEs 1202, along with any additional elements suitable to support communication between UEs 1202 or between a UE 1202 and another communication device (such as a landline telephone).

Figure 13:
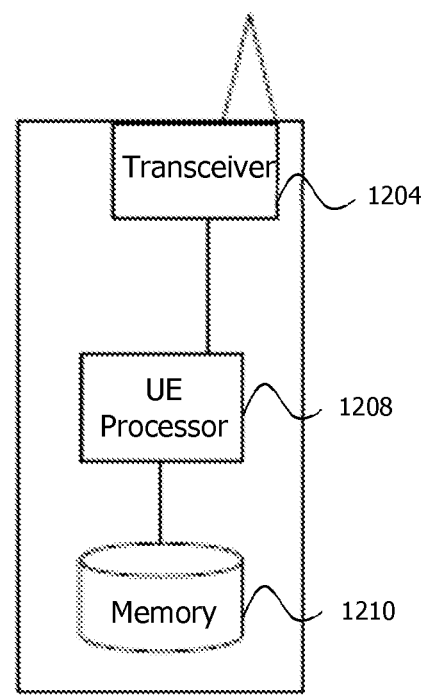
FIG. 13 schematically illustrates an embodiment of a user equipment in wireless communication with the radio transmitter of FIG. 11.

Although the illustrated UEs 1202 may represent communication devices that include any suitable combination of hardware and/or software, these UEs 1202 may, in particular embodiments, represent devices such as the example UE 1202 illustrated in greater detail by FIG. 13.

As shown in FIG. 13, the example UE 1202 includes a processor 1208, a memory 1210, a transceiver 1204, and an antenna. In particular embodiments, any functionality necessary to support the technique described above may be provided by the UE processor 1208 executing instructions stored on a computer-readable medium, such as the memory 1210 shown in FIG. 13. Alternative embodiments of the UE 1202 may include additional components beyond those shown in FIG. 13 that may be responsible for providing certain aspects of the functionality of the UE 1202, including any of the functionality necessary to support the technique described above.

As has become apparent from above description of example embodiments, embodiments introduce an LSA support in mobile networks.

Many advantages of the present invention will be fully understood from the foregoing description, and it will be apparent that various changes may be made in the form, construction and arrangement of the units and devices without departing from the scope of the invention and/or without sacrificing all of its advantages. Since the invention can be varied in many ways, it will be recognized that the invention should be limited only by the scope of the following claims.

The invention claimed is:

1. A method of assigning spectral resources in a cellular network for wireless communications, wherein the spectral resources are partly utilized by other applications, the method comprising:
receiving, at a controller of the cellular network, information indicative of one or more geographical areas and restrictions within the one or more geographical areas; and
assigning spectral resources based on the received information;
wherein the one or more geographical areas are specified by means of polygons; and
wherein the information includes, or is associated with, a set of attributes that define the restrictions within the one or more geographical areas, the attributes comprising Absolute Radio-Frequency Channel Number (ARFCN), timing, allowed reference signal power, and allowed maximum transmission power.

2. The method of claim 1, further comprising performing a mapping between radio transmitters of the cellular network and the one or more areas.

3. The method of claim 1, further comprising transferring the information to a separate entity for a mapping between radio transmitters of the cellular network and the one or more areas.

4. The method of claim 2, wherein:
the radio transmitters include base stations of the cellular network; and
the one or more areas are mapped to locations and/or coverage areas of the base stations.

5. The method of claim 2, wherein the assigning includes setting a configuration of the respective radio transmitters.

6. The method of claim 5, wherein the configuration relates to at least one of: output power levels; antenna directions; antenna tilts; and frequencies.

7. The method of claim 1, wherein the controller is implemented by a network management system of the cellular network.

8. The method of claim 1, wherein the restrictions in the information restrict usage of the spectral resources for the wireless communications.

9. The method of claim 1, wherein the information is received from a repository.

10. The method of claim 9, wherein the repository is at least one of:
accessed by, or accessible to, different controllers including the controller;
accessed by, or accessible to, different cellular networks including the cellular network; and
located outside of a domain of the cellular network.

11. The method of claim 9, wherein the repository keeps an updated set of the restrictions.

12. The method of claim 1, wherein the restrictions relate to at least one of: geographical aspects; frequency aspects; power level aspects; and timing aspects.

13. The method of claim 1, wherein the restrictions include at least one of regulatory restrictions and incumbent restrictions.

14. The method of claim 1, wherein the received information is included in a message according to a Licensed Sharing Access (LSA) protocol.

15. A method of assisting in the assignment of spectral resources in a cellular network for wireless communications, wherein the spectral resources are partly utilized by other applications, the method comprising:
storing a set of restrictions for the spectral resources; and
sending, to a controller of the cellular network, information indicative of one or more geographical areas and restrictions within the one or more geographical areas;
wherein the one or more geographical areas are specified by means of polygons; and
wherein the information includes, or is associated with, a set of attributes that define the restrictions within the one or more geographical areas, the attributes comprising Absolute Radio-Frequency Channel Number (ARFCN), timing, allowed reference signal power, and allowed maximum transmission power.

16. The method of claim 15, wherein the method further comprises updating the set of restrictions for the spectral resources.

17. The method of claim 15, wherein the method further comprises receiving information indicative of regulatory or incumbent restrictions for updating the set of restrictions for the spectral resources.

18. The method of claim 15, wherein the restrictions in the information restrict usage of the spectral resources for the wireless communications.

19. The method of claim 15, wherein the method is implemented by a repository.

20. The method of claim 19, wherein the repository is at least one of:
accessed by, or accessible to, different controllers including the controller;
accessed by, or accessible to, different cellular networks including the cellular network; and
located outside of a domain of the cellular network.

21. The method of claim 19, wherein the repository keeps an updated set of the restrictions.

22. The method of claim 15, wherein the restrictions relate to at least one of: geographical aspects; frequency aspects; power level aspects; and timing aspects.

23. The method of claim 15, wherein the restrictions include at least one of regulatory restrictions and incumbent restrictions.

24. The method of claim 15, wherein the sent information is included in a message according to a Licensed Sharing Access (LSA) protocol.

25. A computer program product stored in a non-transitory computer readable medium for assigning spectral resources in a cellular network for wireless communications, wherein the spectral resources are partly utilized by other applications, the computer program product comprising software instructions which, when executed on one or more computing devices, causes the computing device to:

receive, at a controller of the cellular network, information indicative of one or more geographical areas and restrictions within the one or more geographical areas; and assign spectral resources based on the received information;

wherein the one or more geographical areas are specified by means of polygons; and wherein the information includes, or is associated with, a set of attributes that define the restrictions within the one or more geographical areas, the attributes comprising Absolute Radio-Frequency Channel Number (ARFCN), timing, allowed reference signal power, and allowed maximum transmission power.

26. A computer program product stored in a non-transitory computer readable medium for assisting in the assignment of spectral resources in a cellular network for wireless communications, wherein the spectral resources are partly utilized by other applications, the computer program product comprising software instructions which, when executed on one or more computing devices, causes the computing device to:

store a set of restrictions for the spectral resources; and send, to a controller of the cellular network, information indicative of one or more geographical areas and restrictions within the one or more geographical areas;

wherein the one or more geographical areas are specified by means of polygons; and wherein the information includes, or is associated with, a set of attributes that define the restrictions within the one or more geographical areas, the attributes comprising Absolute Radio-Frequency Channel Number (ARFCN), timing, allowed reference signal power, and allowed maximum transmission power.

27. A device for assigning spectral resources in a cellular network for wireless communications, wherein the spectral resources are partly utilized by other applications, the device is configured to:

receive, at a controller of the cellular network, information indicative of one or more geographical areas and restrictions within the one or more geographical areas; and assign spectral resources based on the received information;

wherein the one or more geographical areas are specified by means of polygons; and wherein the information includes, or is associated with, a set of attributes that define the restrictions within the one or more geographical areas, the attributes comprising Absolute Radio-Frequency Channel Number (ARFCN), timing, allowed reference signal power, and allowed maximum transmission power.

28. A device for assigning spectral resources in a cellular network for wireless communications, wherein the spectral resources are partly utilized by other applications, the device is configured to:

store a set of restrictions for the spectral resources; and send, to a controller of the cellular network, information indicative of one or more geographical areas and restrictions within the one or more geographical areas;

wherein the one or more geographical areas are specified by means of polygons; and wherein the information includes, or is associated with, a set of attributes that define the restrictions within the one or more geographical areas, the attributes comprising Absolute Radio-Frequency Channel Number (ARFCN), timing, allowed reference signal power, and allowed maximum transmission power.

* * * * *

UNITED STATES PATENT AND TRADEMARK OFFICE
CERTIFICATE OF CORRECTION

PATENT NO. : 10,080,141 B2
APPLICATION NO. : 14/758257
DATED : September 18, 2018
INVENTOR(S) : Buchmayer et al.

Page 1 of 1

It is certified that error appears in the above-identified patent and that said Letters Patent is hereby corrected as shown below:

In the Specification

In Column 5, Line 29, delete "usage to" and insert -- usage of --, therefor.

In the Claims

In Column 12, Line 3, delete "of 1," and insert -- of claim 1, --, therefor.

Signed and Sealed this
Twenty-seventh Day of November, 2018

Andrei Iancu
*Director of the United States Patent and Trademark Office*